May 5, 1936.  W. MacNERLAND  2,039,431
STOKING DEVICE
Filed Feb. 11, 1933  2 Sheets-Sheet 1
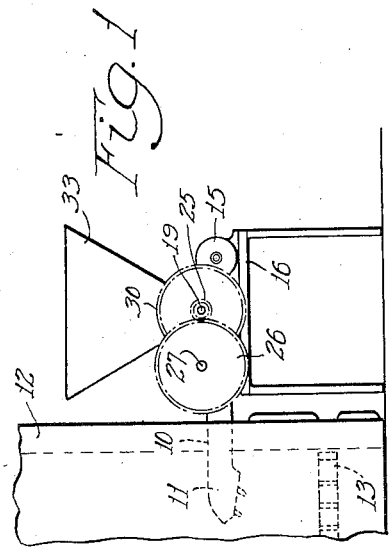
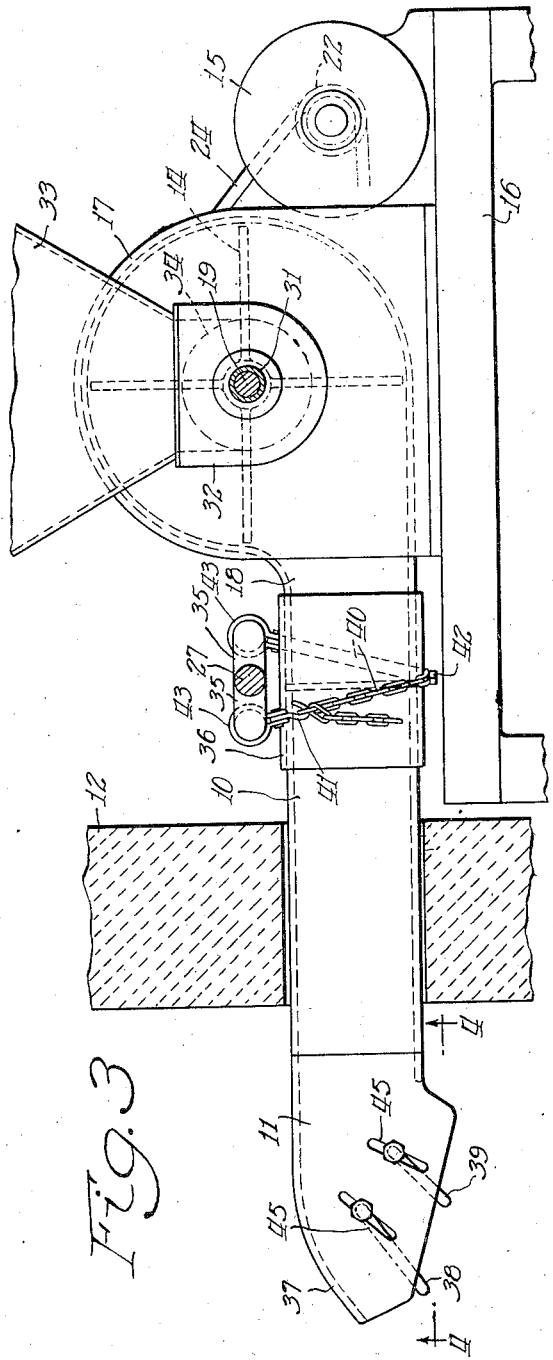
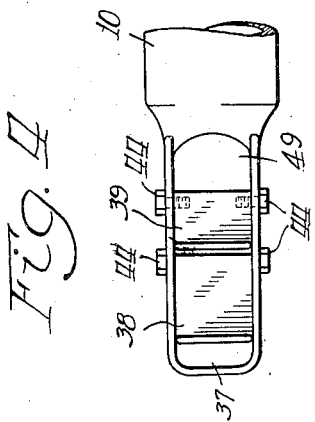
Inventor
William MacNerland
By: Ernest E. Tupes
Atty.
Witness:
V. Siljander

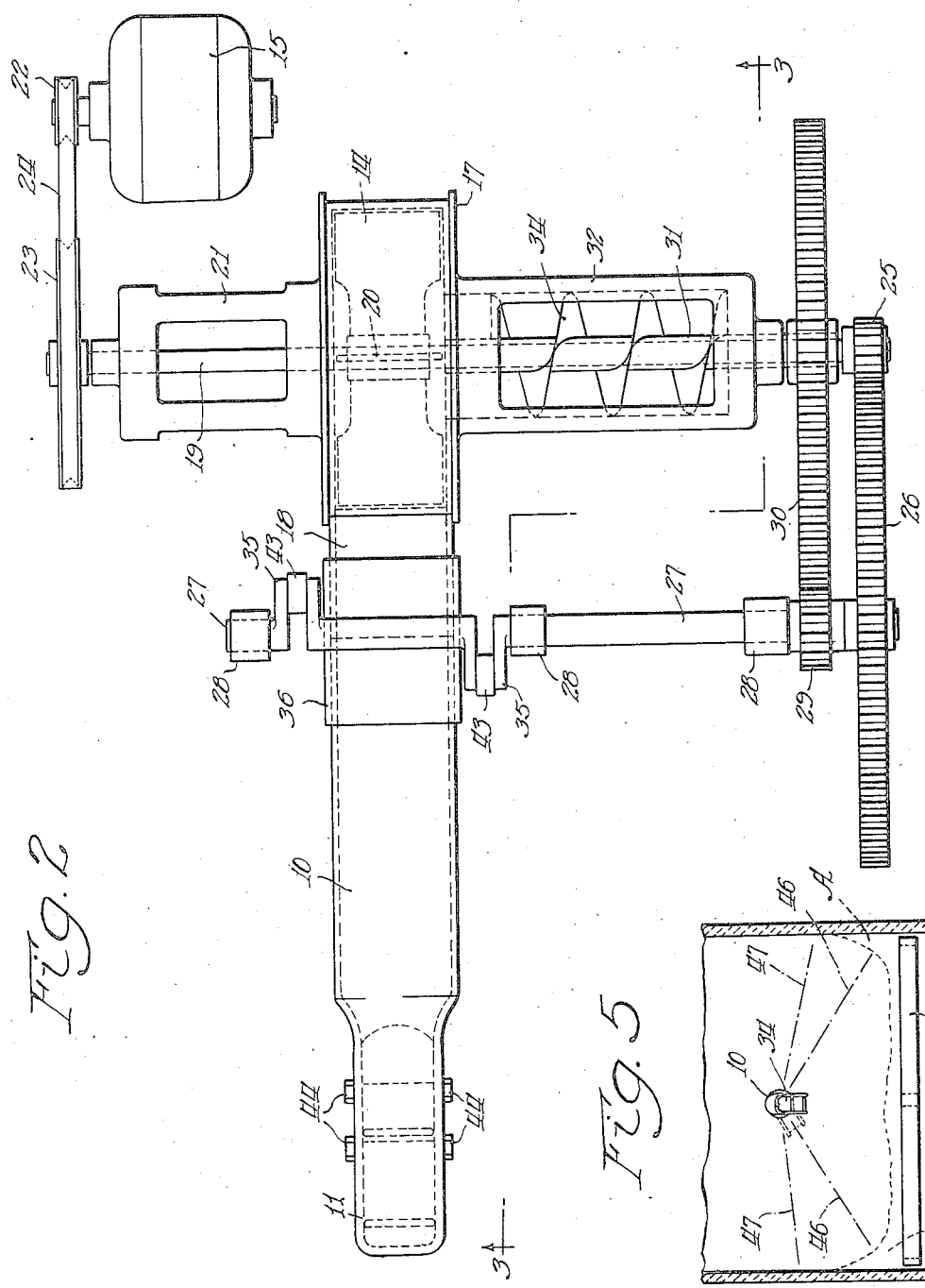

Patented May 5, 1936

2,039,431

UNITED STATES PATENT OFFICE 2,039,431

STOKING DEVICE

William MacNerland, Chicago, Ill., assignor to Air-Zone Stoker Company, Chicago, Ill.

Application February 11, 1933, Serial No. 656,338

8 Claims. (Cl. 110—104)

The invention relates to a method for stoking furnaces and apparatus for practicing the method and more particularly the invention relates to a method and apparatus for delivering air mixed with fuel downwardly over the grate of a furnace in a manner tending to produce balanced draft.

The invention is particularly adapted to natural draft furnaces having a combustion chamber of limited or restricted depth and volume and provides a method and means for discharging movable streams of air mixed with fuel downwardly onto the fire bed in a manner creating local turbulency along the moving zone of contact of the mixture with the fire bed, with the result that complete combustion of the gases, released by contact of fresh fuel with the fire bed, is substantially instantaneously effected and before such gases have risen more than a short distance above the fire bed. The delivery of air downwardly onto the fire bed minimizes stratification and also diminishes the amount of air that would otherwise have to be fed upwardly through the fuel bed.

The foregoing new and desirable results are accomplished by novel apparatus operable to deliver above the fire bed a downwardly inclined stream of fuel mixed with air, the stream being given an oscillating or fan-like movement causing the zone of contact of the fuel with the fire bed to be constantly shifted back and forth and providing local turbulency sufficient to prevent stratification and to effect the maximum combustion of the gases. The downward flow of air reduces the velocity of air otherwise flowing upwardly through the fuel bed in a natural draft furnace and tends to maintain balanced draft conditions conducive to complete combustion in the immediate area overlying the fire bed, whereby escape of gases and heat energy from the stack or chimney are minimized.

The invention includes among its objects the provision of an improved method of stoking and apparatus for practicing the method whereby a stream of fuel mixed with air is discharged into and is moved back and forth over the surface of the fire bed in a novel manner.

Another object of the invention is the provision of apparatus operable to deliver air and fuel into the combustion chamber in a manner that prevents stratification of the furnace gases and provides a local turbulency in the moving zone of contact of the fresh fuel with the fire bed.

A further object of the invention is the provision of a novel method of stoking furnaces whereby complete combustion is effected in a combustion chamber of limited volume tending to produce balanced draft with a natural draft furnace.

Still another object of the invention is the provision of improved stoker apparatus operable to deliver a mixture of fuel and air as a stream movable over the fire bed of a furnace in combination with adjustable mechanism for limiting the sweep of said stream and concentrating the mixture over said zone as desired.

Many other objects and advantages of the construction herein shown and described will be obvious to those skilled in the art from the disclosure herein given.

To this end my invention consists in the novel construction, arrangement and combination of parts herein shown and described, and more particularly pointed out in the claims.

In the drawings, wherein like reference characters indicate like or corresponding parts;

Fig. 1 is a diagrammatic view of a device embodying the invention shown in elevation in operative relation with a furnace;

Fig. 2 is a plan view of the device shown in Fig. 1 drawn to a larger scale and with the hopper omitted;

Fig. 3 is a partial sectional and elevational view along the line 3—3 of Fig. 2;

Fig. 4 is a view along the line 4—4 of Fig. 3; and

Fig. 5 is a diagrammatic sectional view through a furnace with which the device is operatively connected.

Referring now more particularly to the drawings, the device comprises means for mixing air and fuel and delivering the mixture through a conduit 10 terminating in a discharge nozzle 11. The conduit 10 projects through the wall 12 of a furnace as best shown in Fig. 3 and means is provided for oscillating the conduit 10 and nozzle 11 about the longitudinal axis of the conduit. The oscillation of the conduit 10 and of the nozzle 11 may be substantially 180° or any lesser amount sufficient to distribute the mixture of fuel and air discharged by the nozzle over the width of a grate 13.

A rapidly revolving fan 14 performs the dual function of delivering both fuel and air into the furnace through the conduit 10 and nozzle 11 at a velocity sufficient to distribute the fuel and air over the grate area. The fan 14 is mounted on a shaft 19 and is fastened to the shaft by a key 20. The shaft 19 is shown as actuated by a motor 15 by means of a V-belt 24 operatively connecting a sheave 23 fixedly mounted on the shaft with a sheave 22 mounted on the shaft of the motor. A pinion 25 is mounted on the other end of the shaft 19 in mesh with a gear 26, fixedly mounted on a crank shaft 27. The shaft 19 is supported by a pedestal 21 and the shaft 27 is carried by a plurality of bearings 28 mounted on pedestals (not shown). A frame or member 16, shown more or less diagrammatically, provides a support for the shafts 19 and 27 and for the pedestals and bearings carrying the same, as well as a support for the motor 15. The height of the supporting member 16 is such that the oscillating conduit 10 and nozzle 11 are positioned at the required elevation to deliver a stream of fuel laden air back and forth over the grate.

The fan 14 is mounted in a housing 17 providing an outlet conduit 18 in longitudinal alignment with the delivery conduit 10. A sleeve 36, connecting the adjacent ends of the conduits 10 and 18, is fixedly fastened to the conduit 10 and is oscillated about the longitudinal axis of the conduits. The crank shaft 27 extends transversely over the sleeve 36 and by its rotation causes oscillation of the sleeve and also of the conduit 10 and the nozzle 11. The crank shaft 27 has a pair of spaced apart arms 35 projecting from opposite sides of the shaft and positioned one on each side of the sleeve 36. A chain 40 operatively connects the crank shaft 27 with the sleeve 36 in a manner such that one complete revolution of the crank shaft causes the sleeve 36 to oscillate through a predetermined angle and to return to its original starting position. The middle of the chain 40 is fastened to the underside of the sleeve 36 by a bolt 42 and the ends of the chain 40 are fastened to the crank arms 35 by hooks 41 suspended from collars 43. The collars 43 are mounted on and rotatable about the crank arms 35 and the hooks 41 are adapted for insertion through any of the links comprising the chain 40. In Fig. 3, the chain 40 is shown as attached to the hooks 41 in a manner such that there is no slack in the chain and the revolution of the crank shaft 27 thereby produces a maximum angular oscillation of the conduit 10 and of the nozzle 11 mounting to approximately 180°. More limited oscillation of the conduit 10 and nozzle 11 will result from the revolution of the crank shaft 27 by providing slack in the chain 40 rather than having the same taut as shown. The chain 40 may be caused to hang loose by engaging the hooks 41 with one of the links forming the loose hanging ends of the chain. The crank arms 35 will in revolving first take up the slack in the chain 40 and while doing so, the conduit 10 and the nozzle 11 will remain stationary and the resulting oscillatory movement will start only when the corresponding end of the chain is again drawn taut. The amount of slack in the chain 40 may be increased or diminished and the oscillation of the nozzle varied as desired by selectively engaging the hooks 41 with different links of the chain 40.

Coal is delivered axially into the fan 14 from a hopper 33 which is mounted on a trough 32 containing a screw 34. The screw 34 is actuated by a sleeve 31 mounted on and adapted to be oscillated about the shaft 19. The sleeve 31 is driven by a gear 30 which meshes with a pinion 29 mounted on and rotatable by the crank shaft 27 so that the rotation of the shafts 19 and 27 also actuates the screw 34. The shaft 19 is rotated rapidly to produce the requisite velocity of the fan 14 and the gear mechanism is stepped down to produce slow rotation of the screw 34 and relatively slow oscillation of the nozzle 11. The delivery of the coal axially into the fan results in direct contact of the fan blades therewith and the velocity of the fan is such that its impact with the coal propels the coal through the conduit 10 and the nozzle 11 into the furnace. The revolving fan also directs air through the conduit 10 and nozzle 11 so that a mixture of coal and air is delivered from the nozzle but the air and coal do not necessarily travel at the same velocity and the air does not act wholly as a coal carrying medium.

The forward end 37 of the nozzle 11 is inclined and the adjacent lower portion of the nozzle provides an aperture 49 in which baffle plates 38 and 39 are so positioned and inclined to the line of travel of the fuel laden air through the conduit 10 as to deflect the mixture of air and fuel downwardly at different angles. Lines 46 and 47 of Fig. 5 indicate different directions taken by the mixture of air and fuel as the nozzle 10 is oscillated about its longitudinal axis. The inclined end 37 of the nozzle 11 and the baffle plates 38 and 39 act as deflectors which are so arranged that the fuel laden air escapes from the nozzle in a narrow fan-shaped stream having a spread adapting it to cover substantially the full length of the grate. The oscillation of the nozzle 11 above the grate is such that there is little lateral spread of the stream of fuel laden air before it strikes the fire bed and as a result fuel and air are delivered to the fire bed over an oscillating narrow elongated zone.

The fan 14 is revolvable at a high speed so that fuel such for example as coal screenings containing relatively large lumps of coal as well as other hard fuel may be carried through the conduit 10 and be deflected downwardly and distributed over the grate by contact with the inclined end 37 of the nozzle and with the baffle plates 38 and 39. The inclination and position of the baffle plates 38 and 39 may be arranged for uniform distribution of the fuel over the fire bed or may be shifted to concentrate the mixture of fuel and air as desired over different portions thereof. For this purpose, I have provided stud bolts 44 and slots 45 in the nozzle 11. The bolts are adapted to hold the baffle plates 38 and 39 at any desired inclination to the axis of the conduit 10. The slots 45 permit the bolts to be shifted and the baffle plates 38 and 39 to be moved inwardly and outwardly to intercept more or less of the mixture of air and fuel in accordance with the desired concentration of fuel and air over different portions of the grate. The baffles in the elongated conduit in effect space the lower aperture into a series of longitudinal passages.

The contact of the stream of fuel laden air with the fire bed creates a local turbulency inducing rapid combustion of the gases. As the conduit 10 and nozzle 11 are oscillated in the manner hereinbefore described, the escaping stream of fuel laden air is caused to move back and forth transversely of the furnace. The rate of oscillation is such as to provide a localized zone of turbulency over the entire length of the fire bed at frequencies tending to effect rapid combustion and to maintain incandescence of the fire bed over the entire grate surface.

The capacity of the furnace may be changed to meet varying load conditions, the maximum capacity being maintained by oscillating the nozzle 11 in a manner to discharge over the entire width of the grate with the stream of fuel laden air extending the full length of the grate. Minimum load conditions may be met economically by banking fuel along each side of the furnace as shown at A in Fig. 5. The banking of the coal along the sides of the furnace can be accomplished by maintaining the nozzle 11 in substantially horizontal discharging position wherein the fuel will move along the lines 47 as shown in Fig. 5, thereby causing the fuel to strike the sides of the furnace and permitting its collection as at A. The exposed area between the side banks of fuel A can then be kept supplied with fuel and turbulent air by limiting the oscillation of the nozzle 11 to discharge fuel between the dotted lines 46, the chain 40 being fastened to provide the proper slack to limit the oscillation within this zone in the manner already described.

Thus, it will be seen that I have provided an improved method of stoking and means for practicing the method wherein fuel and air are discharged downwardly over the grate surface in a shifting zone in a manner to minimize the upward flow of air through the fuel bed, thereby preventing stratification of the gases and producing local turbulency in a manner to effect rapid combustion in a natural draft furnace having a combustion chamber of limited volume.

Having thus described my invention, it is obvious that various immaterial modifications may be made in the same without departing from the spirit of my invention; hence, I do not wish to be understood as limiting myself to the exact form, construction, arrangement and combination of parts herein shown and described or uses mentioned.

What I claim as new and desire to secure by Letters Patent is:

1. The method of stoking a furnace having a grate which consists in the simultaneous delivery of fuel and air uniformly over a narrow zone extending at all times the full length of the furnace and intermittently shifting said delivery zone laterally back and forth from side to side of the entire fuel bed.

2. A stoking device for furnaces having a grate, said device comprising a conduit normally immovable vertically and adapted to extend through a wall of the furnace above and in spaced relation to the grate, means operable to deliver a mixture of fuel and air through said conduit, said conduit having a longitudinally elongated downwardly discharging aperture, baffle plates secured to the conduit and so positioned relative to said aperture as to cause said mixture to discharge through the aperture onto the furnace grate in an elongated narrow zone extending the full length of the grate, and means operable to oscillate said conduit about a longitudinal axis whereby said zone is shifted laterally back and forth to automatically deliver fuel and air over the entire grate surface.

3. A stoking device for furnaces having a grate, said device comprising a conduit normally immovable vertically and adapted to extend through a wall of the furnace above and in spaced relation to the grate, means operable to deliver a mixture of fuel and air through said conduit, said conduit having a longitudinally elongated downwardly discharging aperture, a plurality of baffle plates secured to the conduit and positioned to direct said mixture through the aperture in a narrow elongated zone extending the full length of the grate, means operable to shift the angles of inclination of said plates to vary the distribution of said mixture over said zone as desired, and means operable to oscillate said conduit about a longitudinal axis and thereby shift said zone laterally back and forth to deliver air and fuel over the entire surface of the grate.

4. A stoking device for furnaces having a grate, said device comprising a conduit normally immovable vertically and adapted to extend through a furnace wall in spaced relation to the furnace grate, means operable to drive a mixture of air and fuel through the conduit, said conduit having a longitudinally elongated downwardly discharging aperture, baffle means secured to said conduit and positioned relative to said aperture to cause the discharge of said mixture in a narrow elongated zone extending the full length of the grate, means operable to oscillate said conduit about a longitudinal axis between predetermined maximum limits whereby said zone moves laterally back and forth over said grate, and means adjustable to selectively limit the amount of said conduit oscillation within said predetermined limits.

5. A stoking device for furnaces comprising a horizontally extending conduit oscillatable about a longitudinal axis and having a longitudinally elongated downwardly discharging aperture, means operable to deliver a mixture of fuel and air through said conduit, baffle means secured to the conduit and so positioned relative to said aperture as to deliver said mixture through the aperture in an elongated narrow zone, and means operable to oscillate said conduit about a longitudinal axis between predetermined maximum limits whereby said zone is automatically shifted back and forth laterally.

6. A stoking device comprising a horizontally extending conduit normally immovable vertically and oscillatable about a longitudinal axis, said conduit having a longitudinally elongated downwardly discharging aperture, means operable to deliver a mixture of air and fuel through the conduit, baffle means secured to said conduit and so positioned relative to said aperture as to deliver said mixture through the aperture in a narrow elongated zone, means operable to oscillate said conduit about a longitudinal axis between predetermined maximum limits whereby said zone is automatically shifted laterally back and forth, and means adjustable to selectively limit the amount of said conduit oscillation within said predetermined limits.

7. A stoking device for furnaces comprising a horizontally extending conduit oscillatable about a longitudinal axis and having a longitudinally elongated downwardly discharging aperture, means operable to deliver a mixture of fuel and air through said conduit, a plurality of baffle plates secured to the conduit and positioned to deflect and deliver said mixture through the aperture in a narrow elongated zone, means operable to shift the position of said plates to vary the distribution of said mixture over said zone as desired, and means operable to oscillate said conduit between predetermined maximum limits whereby said zone is correspondingly shifted back and forth laterally.

8. A stoking device comprising a horizontally extending conduit oscillatable about a longitudinal axis and having a longitudinally elongated downwardly discharging aperture, means operable to deliver a mixture of fuel and air through said conduit, a plurality of baffle plates secured to the conduit and positioned to deflect and deliver said mixture through the aperture in a narrow elongated zone, means operable to shift the position of said plates to vary the distribution of said mixture over said zone as desired, means operable to oscillate said conduit about a longitudinal axis between predetermined maximum limits whereby said zone is automatically shifted back and forth laterally, and means adjustable to selectively limit the amount of said conduit oscillation within said predetermined limits.

WILLIAM MacNERLAND.